US008487975B2

(12) United States Patent
King et al.

(10) Patent No.: US 8,487,975 B2
(45) Date of Patent: Jul. 16, 2013

(54) CONFERENCING SYSTEM UTILIZING A MOBILE COMMUNICATION DEVICE AS AN INTERFACE

(75) Inventors: Keith C. King, Austin, TX (US); Matthew K. Brandt, Driftwood, TX (US)

(73) Assignee: LifeSize Communications, Inc., Austin, TX (US)

( * ) Notice: Subject to any disclaimer, the term of this patent is extended or adjusted under 35 U.S.C. 154(b) by 800 days.

(21) Appl. No.: 12/692,915

(22) Filed: Jan. 25, 2010

(65) Prior Publication Data

US 2010/0188473 A1 Jul. 29, 2010

Related U.S. Application Data

(60) Provisional application No. 61/147,672, filed on Jan. 27, 2009.

(51) Int. Cl.
*G06F 3/00* (2006.01)
*G06Q 10/10* (2012.01)
*H04M 3/56* (2006.01)
*H04N 7/14* (2006.01)

(52) U.S. Cl.
USPC .......... 348/14.02; 348/14.01; 348/14.03; 348/14.08; 348/14.09; 370/261; 379/202.01; 379/204.01; 455/413; 455/416; 709/201; 709/204; 709/207; 709/223; 715/753; 726/4

(58) Field of Classification Search
USPC .......... 348/14.01, 14.02, 14.03, 14.08, 14.09; 379/202.01, 204.01; 709/201, 204, 207, 223; 715/753; 370/261; 455/413, 416; 726/4
See application file for complete search history.

(56) References Cited

U.S. PATENT DOCUMENTS

| | | | | |
|---|---|---|---|---|
| 6,714,635 | B1 * | 3/2004 | Adams et al. | 379/204.01 |
| 6,870,916 | B2 * | 3/2005 | Henrikson et al. | 379/202.01 |
| 7,283,808 | B2 * | 10/2007 | Castell et al. | 455/413 |
| 7,522,181 | B2 | 4/2009 | Wilson, Jr. et al. | |
| 7,675,537 | B2 * | 3/2010 | Wilson et al. | 348/14.01 |
| 7,792,064 | B2 * | 9/2010 | Kim | 370/261 |
| 7,844,260 | B2 * | 11/2010 | Nguyen et al. | 455/416 |
| 7,969,461 | B2 * | 6/2011 | Nimri et al. | 348/14.08 |
| 8,117,550 | B1 * | 2/2012 | Izdepski et al. | 715/753 |
| 8,300,078 | B2 * | 10/2012 | Lovhaugen et al. | 348/14.03 |
| 2002/0098831 | A1 * | 7/2002 | Castell et al. | 455/413 |
| 2004/0078256 | A1 * | 4/2004 | Glitho et al. | 705/8 |
| 2004/0207719 | A1 * | 10/2004 | Tervo et al. | 348/14.02 |
| 2007/0260685 | A1 * | 11/2007 | Surazski | 709/204 |
| 2008/0228852 | A1 * | 9/2008 | Husa et al. | 709/201 |
| 2008/0235362 | A1 * | 9/2008 | Kjesbu et al. | 709/223 |
| 2009/0284579 | A1 | 11/2009 | Knaz | |
| 2009/0284580 | A1 | 11/2009 | Knaz | |
| 2009/0285131 | A1 | 11/2009 | Knaz | |

(Continued)

*Primary Examiner* — Gerald Gauthier
(74) *Attorney, Agent, or Firm* — Meyertons Hood Kivlin Kowert & Goetzel, P.C.; Jeffrey C. Hood; Joel L. Stevens (57) ABSTRACT

Initiating a conference in a conferencing system (e.g., a videoconferencing or aduioconferencing system). Input may be received to the conferencing system from a mobile communication device. The input may specify one or more participants in the videoconference, e.g., by selecting from contact information stored on the mobile communication device. Accordingly, the conferencing system may initiate the conference based on the received input. The videoconference may include the one or more participants selected from the contact information stored on the mobile communication device.

30 Claims, 9 Drawing Sheets

U.S. PATENT DOCUMENTS

| | | | |
|---|---|---|---|
| 2009/0315974 A1* | 12/2009 | Matthews | 348/14.08 |
| 2010/0110161 A1* | 5/2010 | Wilson et al. | 348/14.09 |
| 2010/0188473 A1* | 7/2010 | King et al. | 348/14.02 |
| 2010/0269159 A1* | 10/2010 | Oertel | 726/4 |
| 2010/0315483 A1* | 12/2010 | King | 348/14.08 |
| 2011/0254912 A1* | 10/2011 | Mock et al. | 348/14.03 |

* cited by examiner

CONFERENCING SYSTEM UTILIZING A MOBILE COMMUNICATION DEVICE AS AN INTERFACE

PRIORITY INFORMATION

This application claims benefit of priority of U.S. provisional application Ser. No. 61/147,672, titled "Conferencing System Utilizing a Mobile Communication Device as an Interface" filed Jan. 27, 2009, whose inventors were Keith C. King and Matthew K. Brandt, which is hereby incorporated by reference in its entirety as though fully and completely set forth herein.

FIELD OF THE INVENTION

The present invention relates generally to conferencing and, more specifically, to a method for using a mobile communication device as an interface to a conferencing system.

DESCRIPTION OF THE RELATED ART

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to another (remote) participant. Each videoconferencing system may also include a display and speaker to reproduce video and audio received from one or more remote participants. Each videoconferencing system may also be coupled to (or comprise) a computer system to allow additional functionality into the videoconference. For example, additional functionality may include data conferencing (including displaying and/or modifying a document for both participants during the conference).

Similarly, audioconferencing (e.g., teleconferencing) may allow two or more participants at remote locations to communicate using audio. For example, a speakerphone may be placed in a conference room at one location, thereby allowing any users in the conference room to participate in the audioconference with another set of user(s) (e.g., in another conference room with a speakerphone).

Current conferencing systems allow users to initiate conferences with each other using proprietary systems, but fail to provide adequate flexibility for end users. Correspondingly, improvements in interfaces to conferencing systems are desired.

SUMMARY OF THE INVENTION

Various embodiments are presented of a method for initiating a conference using a mobile communication device.

Input may be received to the videoconferencing system from the mobile communication device. The input may specify one or more participants in the videoconference. For example, the one or more participants may be selected from contact information stored on the mobile communication device, e.g., via a user interface provided on the mobile communication device. The contact information could be selecting a specific contact's phone number, IP address, screen name, picture or other method for connecting to the user (depending on available modes of communication). In one embodiment, the user may simply select the contact, and the default communication mode for that user may be selected.

In one embodiment, the input may be received or transmitted in a wireless manner, e.g., using an 802.11x protocol, a Bluetooth protocol, and/or other wireless protocols. Alternatively, the input may be received in a wired manner. For example, the mobile communication device may be connected to the videoconferencing system via a wire. In one embodiment, the videoconferencing system may include a dock (e.g., on a speakerphone or other portion of the videoconferencing system) where the mobile communication device may be plugged in to the videoconferencing system. The mobile communication device may thus provide input to the videoconferencing system via the dock.

Accordingly, a videoconference may be initiated in the videoconferencing system based on the received input. Thus, the videoconference may include the one or more participants selected from the contact information stored on the mobile communication device.

During the videoconference (and/or at other times), the mobile communication device may act as a remote control for the videoconferencing system. For example, in one embodiment, the mobile communication device may provide one or more commands to the videoconferencing system (e.g., during the videoconference). The commands may be selectable via a user interface of the mobile communication device. For example, a user may interact with the mobile communication device to provide the commands to the videoconferencing system. The one or more commands may correspond to one or more functions provided by the videoconferencing system. Accordingly, the functions may be performed based on the commands.

As one example, the videoconference may be displayed in a first visual configuration (e.g., continuous presence mode, where all of the participants are shown on the screen). The user may then provide a command to modify the first visual configuration (e.g., to provide a different arrangement of the participants in continuous presence mode, or to only show one of the participants on the screen), and accordingly, the videoconference may be displayed in a second visual configuration (e.g., the result of the modification of the first visual configuration).

As another example, the videoconferencing system may provide a first video stream in the videoconference (e.g., to the other members of the videoconference). The user may provide or select a command to modify or change from the first video stream (e.g., to switch from sending the user's video feed to a video feed of a desktop computer screen, or other video stream). Accordingly, the first video stream may be modified or switched to another video stream based on the command.

Similarly, the above method could be implemented using a mobile communication device for an audioconference. For example, the mobile communication device could be used to initiate an audioconference, e.g., by providing telephone number information to a speakerphone for the audioconference, although other modes of communication, such as Internet based audioconferencing, are envisioned. Once initiated, the mobile communication device could be used as a controller or remote control of the audioconference and/or the speakerphone (or other audioconferencing system) of the audio conference.

Various portions (or all) of the method described above may be implemented as program instructions stored on a memory medium. For example, the method may be embodied as a computer program that may be executable by various computer systems such as video or audio conferencing systems.

BRIEF DESCRIPTION OF THE DRAWINGS

A better understanding of the present invention may be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. Patent Application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

Figure 1:
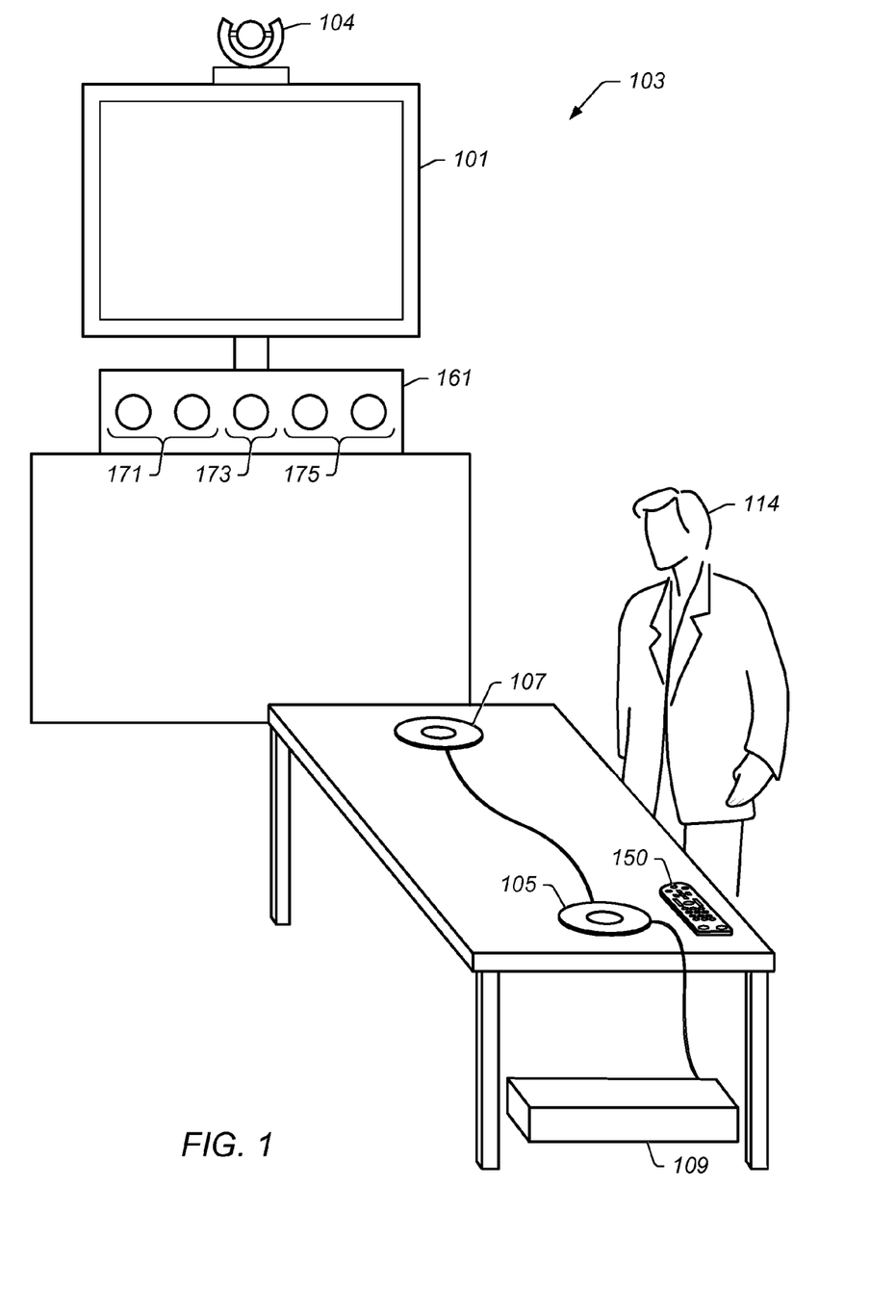
FIG. 1 illustrates a videoconferencing system participant location, according to an embodiment.

FIG. 1—Exemplary Participant Location

FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on a floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system. The conferencing system may be controlled by a participant or user through the user input components (e.g., buttons) on the speakerphones 105/107 and/or remote control 150. Other system interfaces may also be used.

In various embodiments, a codec may implement a real time transmission protocol. In some embodiments, a codec (which may be short for "compressor/decompressor") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 103 may be designed to operate with normal display or high definition (HD) display capabilities. The videoconferencing system 103 may operate with a network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system with a video camera, microphone and/or speakers). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

Note that the videoconferencing system shown in FIG. 1 may be modified to be an audioconferencing system. The audioconferencing system, for example, may simply include speakerphones 105/107, although additional components may also be present. Various embodiments described herein describe the use of a mobile communication device as an interface to the conferencing system. Additionally, note that any reference to a "conferencing system" or "conferencing systems" may refer to videoconferencing systems or audio conferencing systems (e.g., teleconferencing systems).

Figure 2A:
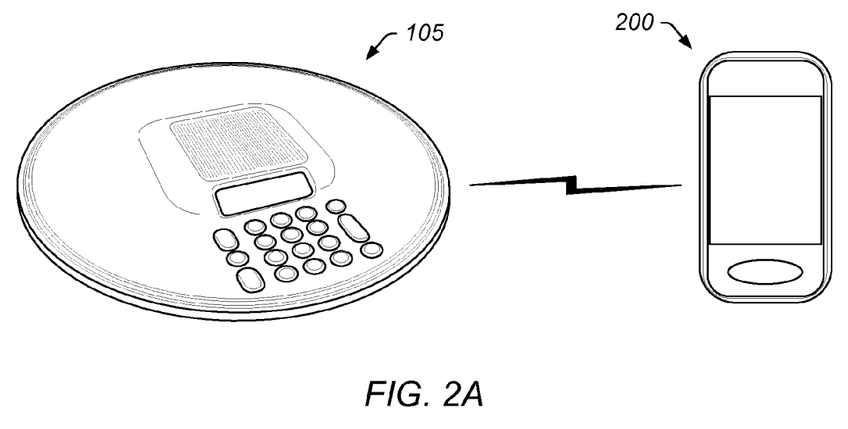
FIGS. 2A and 2B illustrate an exemplary mobile communication device and speaker phone, according to an embodiment.
Figure 2B:
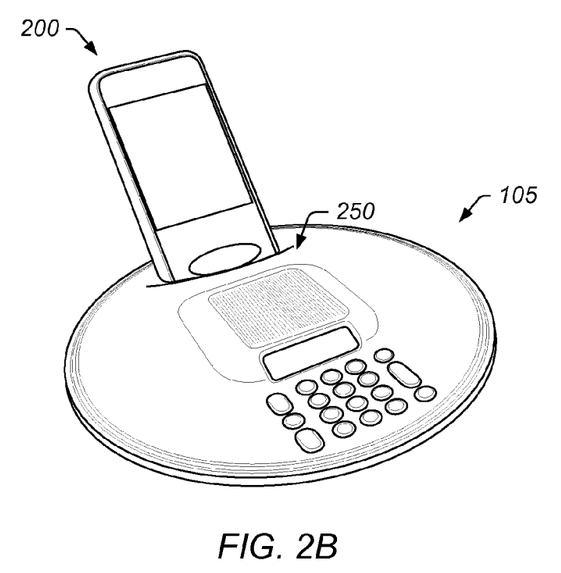

FIGS. 2A and 2B—Mobile Communication Device Coupled to a Speakerphone

FIGS. 2A and 2B illustrate an exemplary mobile communication device 200 coupled to speakerphone 105. More specifically, FIG. 2A illustrates an embodiment where the mobile communication device 200 may communicate with the speakerphone 105 in a wireless manner. For example, the wireless communication may be performed using any of various wireless protocols, such as 802.11x (e.g., 802.11g, 802.11n, etc.), Bluetooth, etc. For example, the speakerphone 105 and the mobile communication device 200 may be coupled to the same wireless network and may communicate on that network. In another embodiment, the speakerphone may also provide wireless access point functionality for the mobile communication device 200, e.g., to provide local network connectivity and/or wide area network connective (e.g., the Internet). Alternatively, the wireless communication device 200 may physically couple to the speakerphone 105, e.g., using a wired connection, or by docking to the speakerphone 105 via dock 250, as shown in FIG. 2B.

The mobile communication device 200 may be any type of portable or mobile device that is capable of communicating in a wireless fashion. For example, the mobile communication device may be a cell phone or mobile telephone. In one embodiment, the mobile communication device may be a smart phone such as an iPhone™ provided by Apple Corporation, Instinct™ provided by Samsung Mobile, or a Blackberry™ provided by RIM, although other smart phones are envisioned. Thus the mobile communication device 200 is a mobile device with telephonic communication capabilities. Alternatively, the device 200 may simply be a portable device such as a PDA (which does not have communication capability). However, for the remainder of the description, the device 200 may be referred to as a mobile communication device.

As described below, the mobile communication device 200 may be able to initiate an audioconference or videoconference via the speakerphone 105 (e.g., in a wired/docked or wireless fashion). Additionally, the mobile communication device 200 may be usable as an interface to the audioconferencing or videoconferencing system, e.g., using an application installed on the mobile communication device 200. Further details are provided below.

Figure 3A:
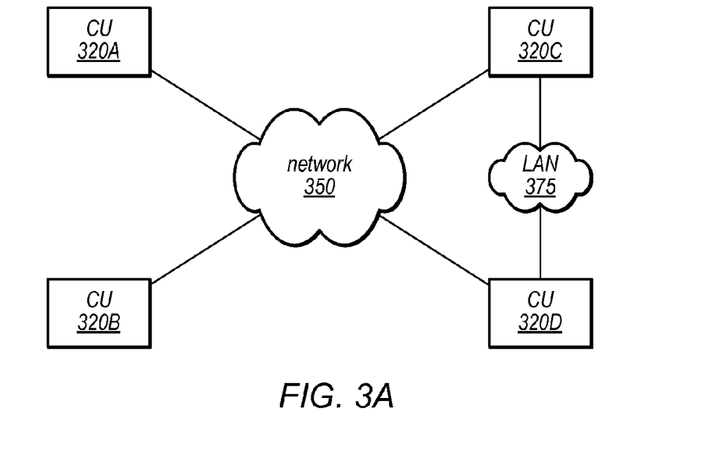
FIGS. 3A and 3B illustrate exemplary videoconferencing systems coupled in different configurations, according to some embodiments.
Figure 3B:
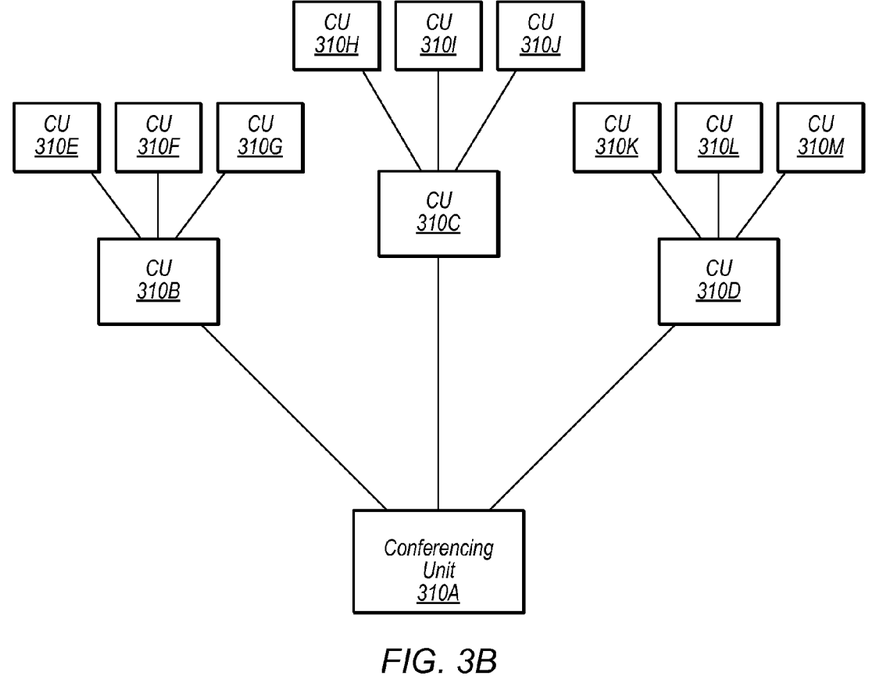

FIGS. 3A and 3B—Coupled Conferencing Systems

FIGS. 3A and 3B illustrate different configurations of conferencing systems. The conferencing systems may be operable to use the mobile communication device 200 described above as an interface to the conferencing system, e.g., as described in more detail below. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to use a mobile communication device 200 as an interface according to the methods described herein, among others. In a similar manner, each of the other CUs shown in FIG. 3B, such as CU 310H, may be able to use a mobile communication device 200 as an interface to the CU, as described in more detail below. Similar remarks apply to CUs 320A-D in FIG. 3A.

Figure 4:
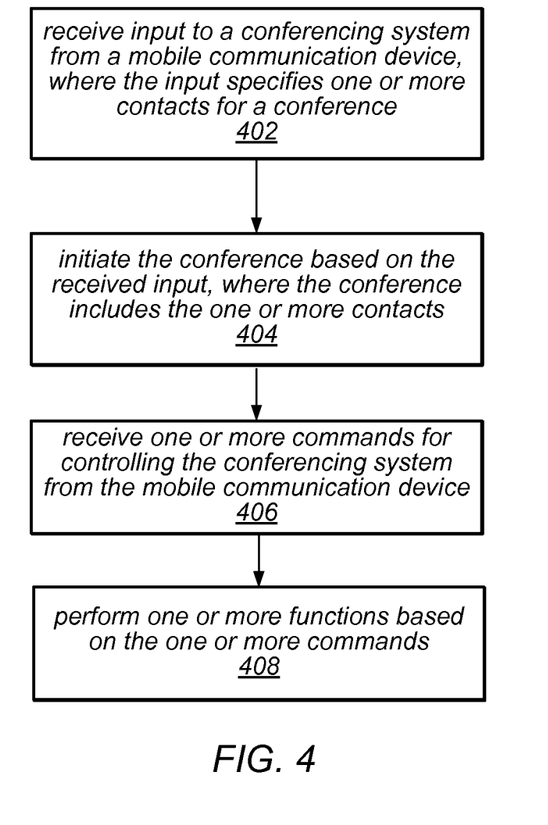
FIG. 4 is a flowchart diagram illustrating an exemplary method for utilizing a mobile device as an interface to a conferencing system, according to an embodiment.

FIG. 4—Mobile Communication Device as an Interface to a Conferencing System

FIG. 4 illustrates a method for using mobile communication device 200 as an interface to a conferencing system. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, input may be received to a conferencing system from mobile communication device 200. As indicated above, the conferencing system may be an audioconferencing system or a videoconferencing system. The audioconferencing system may simply include a speakerphone for telephonic communication, although other embodiments are envisioned, e.g., where a computer system is used for communication over the Internet, among other possibilities. In embodiments where the conferencing system is a videoconferencing system, it may be configured according to various descriptions above, although various additional components or modifications to the videoconferencing system are envisioned.

The input may specify one or more participants in the conference. For example, the one or more participants may be selected from contact information stored on the mobile communication device 200, e.g., via a user interface or graphical user interface provided on the mobile communication device. For example, a user may be able to scroll through his phone contacts and select a desired contact or a plurality of desired contacts. Additionally, or alternatively, the contact information may be associated with a program or application on the mobile communication device which is particularly designed for the conferencing system. Accordingly, the information for the contact may be provided to the conferencing system. The contact information could include a specific contact's phone number, IP address, picture, screen name (e.g., for an online instant messaging service), or other method for selecting and/or connecting to the user (depending on available modes of communication). Thus, the user may select a contact, and then select a specific mode of communication (e.g., telephone, VOIP, etc.) for that contact (e.g., by selecting the appropriate contact information for the contact). Alternatively, the user may simply select the contact from the contacts portion of the mobile communication device's user interface, and a default communication mode or best available mode for that user may be selected.

Note that the user may be able to select a plurality of contacts or more than one contact information entry to provide the input to the conferencing system. For example, the user may be able to select a contact (or specific contact information for a contact) and then select a button to add the contact to the list of conference participants. Alternatively, or additionally, the user may be able to select contacts via checkboxes (or other possible input elements) in the user interface of the mobile communication device, e.g., in the conferencing program stored on the mobile communication device.

Additionally, in one embodiment, the selected contacts (and/or the particular selected contact information) may be for a plurality of different communication modes. For example, the user may select a first contact which may utilize a telephone number for telephonic communication and then select a second contact which may utilize VOIP (e.g., where the contact information is a screen name for an online VOIP service). Thus, the conferencing system may be able to conference multiple modes of communication in the same conference. In some embodiments, the contact list may indicate the available modes of communication for various contacts.

This embodiment may also apply across videoconferences and audioconferences. For example, where a first contact can only perform audioconferencing (e.g., using a telephone) while a second contact is able to perform videoconferencing (e.g., over the Internet), the conferencing system may allow both to be in the same conference, utilizing the available mode (e.g., the best available mode or most compatible available mode) of communication for each user. For example, where two contacts are capable of videoconferencing and one is capable of audioconferencing, a videoconference may be the best available mode for the two contacts who are capable of that mode, and the third contact may be added in with audio only. However, with only one being capable of videoconferencing, and the others only capable of audioconferencing, an audioconference may be the most compatible and most sensible mode for all the members, and may accordingly be selected, e.g., automatically. However, in some embodiments, the user may manually select the mode of communication for the conference.

In alternate embodiments, only a single mode of communication for the group of selected contacts may be usable (but various different modes of communication may be available). Thus, the user could select a conference over a network or over a telephone but not both during the same conference, in this embodiment.

Additionally, as indicated above, the user may not need to actually select a specific mode of communication or contact information for a user, and the conferencing system or mobile communication device 200 may select the most appropriate specific mode of communication for the user and the conference. The most appropriate mode of communication may be based on any of a plurality of factors, e.g., least expensive, highest quality, most overlap with the other selected contacts, etc.

In some embodiments, the input from the mobile communications device 200 may be provided in a wired or wireless manner. For example, the input may be received or transmitted in a wireless manner, e.g., using an 802.11x protocol, a Bluetooth protocol, and/or other wireless protocols. Thus, a user may be able to simply use his phone, e.g., as a remote interface to the conferencing system, to provide the desired contact information to the conferencing system. Accordingly, the user does not have to worry about transferring contact information between the two systems, and may utilize the already stored contact information of his phone, which may be highly desirable to those users who already have a large database of contact information in their phone.

Alternatively, the input may be received in a wired manner. For example, the mobile communication device may be connected to the conferencing system via a wire or cable (e.g., a docking cable). In one embodiment, the conferencing system may include a dock (e.g., on a speakerphone or other portion of the conferencing system) where the mobile communication device may be plugged in to the conferencing system, e.g., into the speakerphone or other component of the conference system. Accordingly, once docked or connected in the wired fashion, the contact information may be provided to the conferencing system, similar to descriptions above.

In addition to providing the selected contact information, when connected (e.g., in a wired or wireless fashion), all or a portion of the contact information stored on the mobile communication device 200 may be provided or synced to the conference system. This action may be invoked by, for example, a user interface of the mobile communication device 200 and/or the conference system, as desired. Thus, when connected, a portion or all of the contact information of the mobile communication device 200 may be available for use in the conferencing system, e.g., even when the mobile communication device 200 is no longer present.

Note that the wired and wireless modes may have different advantages and disadvantages. For example, when utilizing a wired connection, the conference system may be able to provide power to the mobile communication device 200, thereby charging the mobile communication device 200 when docked (e.g., during the conference). Alternatively, when utilizing a wireless connection, the user may be able to more freely use the mobile communication device 200 during the conference. For example, the user may be able to walk freely around the room and not be encumbered by a physical connection to the conference system. Note that the user may have the option for either or both of the wired and wireless coupling of the mobile communication device 200 to the conferencing system.

In 404, the conference may be initiated based on the received input in 402. The conference may include at least one of the one or more contacts specified by the input. More specifically, the conferencing system may attempt to initiate a conference with at least a subset or all of the received contacts or contact information from the mobile communication device 200. Thus, the conferencing system may receive the contact information from the mobile communication device 200 and then initiate the conference using the received contact information. As indicated above, the conference may be an audioconference, such as a teleconference, where at least a subset or all of the received contacts are called using telephone numbers. Alternatively, the audioconference could be performed over a network, e.g., the Internet, using VOIP. Similarly, the conference may be a videoconference, and the videoconference may be established according to any of a variety of methods, e.g., the one described in patent application Ser. No. 11/252,238, which was incorporated by reference above. The videoconference or audioconference may utilize an instant messaging service or videoconferencing service over the Internet using the contact information received from the mobile communication device 200.

In some embodiments, once the conference is initiated, the mobile communication device 200 may be used as a component in the system. For example, the mobile communication device 200 may be used as a remote control for the conferencing system, e.g., using a conferencing program installed on the mobile communication device 200. Alternatively, or additionally, the mobile communication device 200 may be used as an input device for the conferencing system. For example, the mobile communication device 200 could be used as the (or as an additional) microphone or video input for the conference. Similarly, the mobile communication device 200 could be used as the (or as an additional) speaker or video output for the conference. Thus, the user could incorporate his mobile communication device 200 in the conferencing system and utilize it for providing audio or video to the conference and/or for receiving and outputting audio or video from the conference. More specifically, in an audioconference, the user could simply speak into the phone instead of having to move close to or speak loudly for the speakerphone in the middle of the room. As another example, in a videoconference, the user could simply view the videoconference on the mobile communication device 200. Such an embodiment would be especially useful in cases where a video output did not happen to be present in the conference room and/or would allow the user to leave the room while still participating in the conference, e.g., when the mobile communication device 200 is wirelessly connected to the conferencing system.

As indicated above, during the videoconference (and/or at other times), the mobile communication device 200 may act as a remote control for (or otherwise be able to control) the videoconferencing system. Thus, in 406, one or more commands may be received for controlling the conferencing system from the mobile communication device 200 (e.g., during the conference, although it may control the conferencing system at other times as well). The commands may be selectable via a user interface of the mobile communication device 200. For example, a user may interact with the mobile communication device 200 to provide the commands to the videoconferencing system. The one or more commands may correspond to one or more functions provided by the videoconferencing system. Accordingly, in 408, one or more functions corresponding to the one or more commands of 406 may be performed. The following descriptions provide various examples regarding how the mobile conferencing device may be used to control and/or interact with the conferencing system, e.g., for initiating or controlling a conference. However, it should be noted that these are exemplary only, and various other functions are envisioned.

FIGS. 5-13—Exemplary Screenshots

Figure 5:
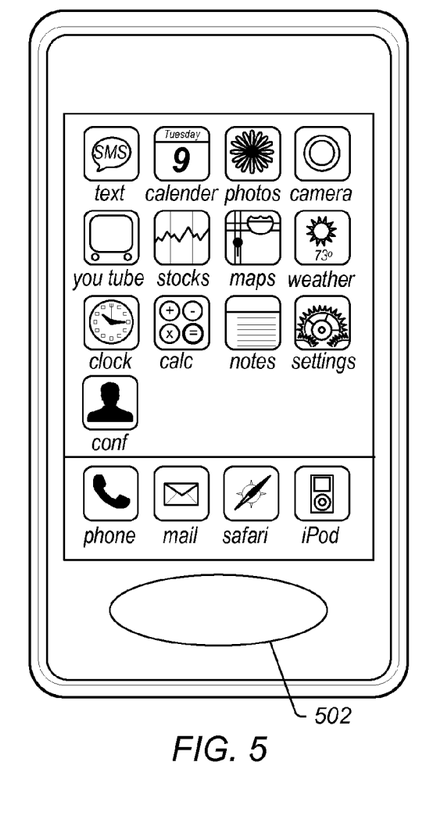
FIGS. 5-13 are exemplary screenshots of a mobile device corresponding to the flowchart diagram of FIG. 4, according to one embodiment.

FIG. 5 illustrates an exemplary mobile communication device 200 screen. As shown, the user may select from a plurality of different icons, each representing different applications of the mobile communication device 200. In the screenshot shown, the icon labeled "conf" may represent a conference control program for controlling the conferencing system. However, it should be noted that references to applications or programs stored or executed by the mobile communication device could be similarly embodied via a web interface. For example, the conferencing system could provide a web interface, and the user could similarly interface with the conferencing system by browsing to that web interface (e.g., using a locally addressed URL).

The user may be able to select the "conf" icon to launch the program on the mobile communication device 200 via a variety of different methods. For example, the mobile communication device 200 my include a touch screen, and the user could simply touch the "conf" icon (e.g., with his finger or a stylus). Alternatively, the user may be able to scroll through the icons using a slider or click wheel. Various other methods for selecting the "conf" icon are envisioned.

Figure 6:
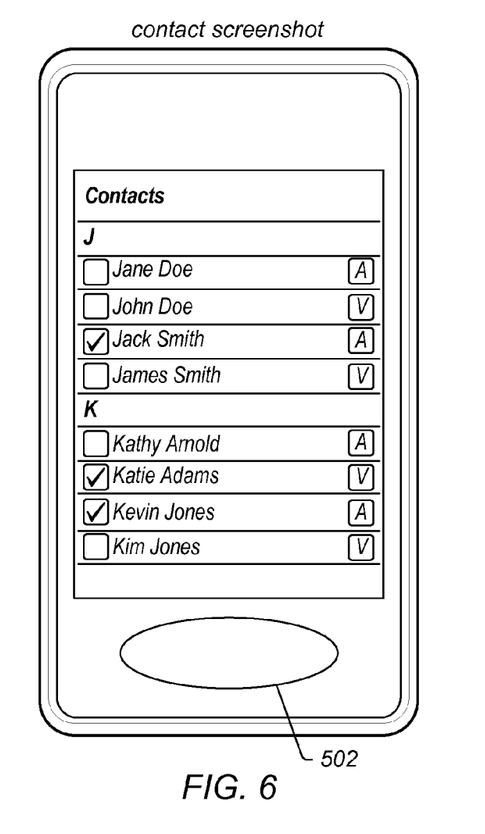

In FIG. 6, contacts are shown for selection in the conference program (although it could be selected from a contacts application of the mobile communication device 200, as desired). In the embodiment shown, each contact may have an indication of the type of conferencing available to that contact, e.g., an "A" icon (shown next to Jane Doe, Jack Smith, Kathy Arnold, and Kevin Jones) may indicate that those contacts are capable of audioconferences, but not videoconferences, whereas a "V" icon (shown next to John Doe, James Smith, Katie Adams, and Kim Jones) may indicate that those contacts are capable of videoconferences and, in some embodiments, may also indicate that those contacts are capable of audioconferences. As also shown, there may be checkboxes next to the contacts, allowing the user of the mobile communication device 200 to easily select a plurality of contacts for initiating a conference, e.g., for provision to the conferencing system, as described above. In this particular example, the user has selected Jack Smith, Katie Adams, and Kevin Jones for the conference. In this case, an audioconference may be performed since only Katie Adams is capable of performing a videoconference. In some embodiments, the selection screen may include one or more additional buttons or user interface elements for initiating the conference once the contacts are selected.

Figure 7:
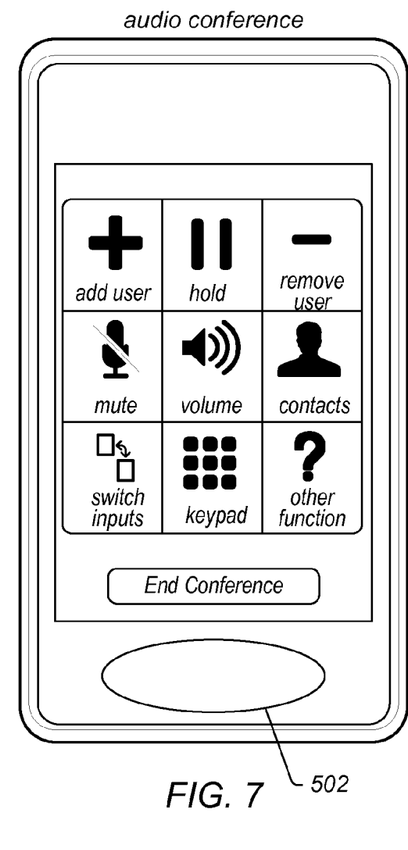

In FIG. 7, an exemplary control screen is shown, which may be displayed during an audioconference. As shown, the user may select "add user" (shown as a plus icon) in order to add another user to the audioconference, e.g., by merging a call in. In some embodiments, when another user calls the mobile communication device 200, the user may be able to answer them and/or merge the call in with the audioconference. The user may also select "hold" to place the audioconference on hold, "remove user" to remove a user from the audioconference, "mute" to mute all audio input to the conference, "volume" to control audio output of the audioconference (e.g., of the audioconferencing system or speakerphone), "contacts" to browse through other contacts on the mobile communication device 200, "switch inputs" to switch the audio input from a first input to a second input, "keypad" to be able to provide numeric information to the conference system (e.g., for interacting with an automated telephone service), and "other functions" to access other audioconference functions available to the user. In some embodiments, the switch input command may automatically switch from the first input to the next input. The next input may be selected according to a set cycle of inputs (e.g., where there are more than two inputs) or may simply select the only available alternate input. Alternatively, selecting "switch inputs" may provide another interface where the user may select from a plurality of displayed inputs. In one embodiment, the inputs may include a first speakerphone of the audioconferencing system, a second speakerphone of the audioconferencing system, the mobile communication device 200, a computer system (e.g., audio playback of a program executing on the computer system), and/or other inputs.

Note that the above commands are exemplary only and other possible interactions with the conferencing system are envisioned. For example, an icon for switching audio outputs may be used to select and/or control various audio outputs. Alternatively, this may be available when the "speaker" icon is selected. Furthermore, the user may be able to select a "record" icon which may record the audioconference. Once selected, the record icon may toggle to a stop icon in order to stop recording. As also shown, the user may end the conference by selecting the "end conference" button. Additionally, the user may return to the home screen (e.g., shown in FIG. 5) during the audioconference and invoke other programs, e.g., browsing the Internet, checking email, weather, stocks, etc. Various ones of these programs may be able to interact with the audioconference and/or provide audio input to the audioconference, according to various embodiments. For example, the user could select music playback and have that music output be provided to the audioconference, as desired.

Figure 8:
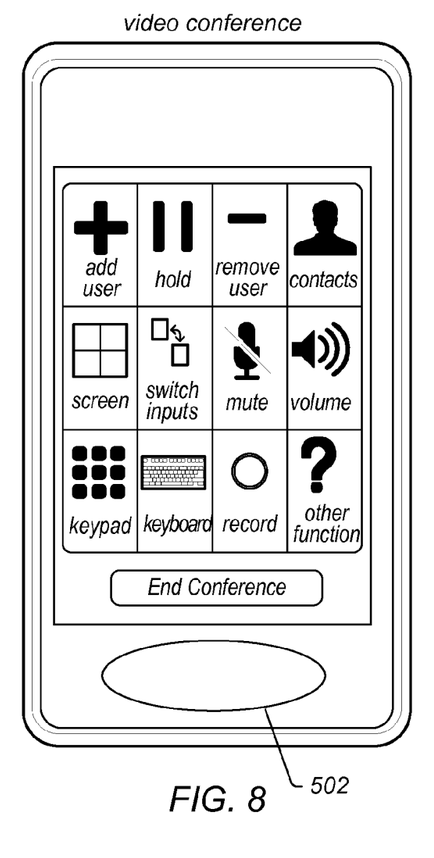

In FIG. 8, similar to above, an exemplary videoconference control screen is shown, which may be displayed during a videoconference. As shown, the user may select "add user" to add a user to the videoconference, "hold" to place the videoconference on hold, "remove user" to remove a user from the videoconference, "contacts" to browse through available contacts, "screen" to manipulate the videoconference screen, "switch inputs" to modify which inputs are provided to the other videoconference users, "mute" for muting audio and/or video inputs to the videoconference, "volume" for controlling and/or selecting audio and/or video outputs from the videoconference, "keypad" for invoking a telephone keypad to provide numeric input to the videoconference from the mobile communication device 200, "keyboard" for providing alphanumeric input to the videoconference from the mobile communication device 200, "record" for recording a portion or all of the videoconference, and "other functions" for selecting other possible functions or commands of the videoconferencing system. The user may be able to end the videoconference by selecting the "end conference" button.

Similar to above, various other functions are envisioned for use during and/or controlling the videoconference from the mobile communication device 200. For example, the user could select the home button to interact with various other programs on the mobile communication device 200 during the videoconference. Similar to above, these programs could be used to interact with the videoconference, e.g., to provide documents, additional video (e.g., as the video input to the videoconference, via a camera of the mobile communication device 200, as an input showing the user interacting with the program, or simply to provide video from the program), additional audio (e.g., as the audio input to the videoconference or simply to provide audio from the program).

Figure 9:
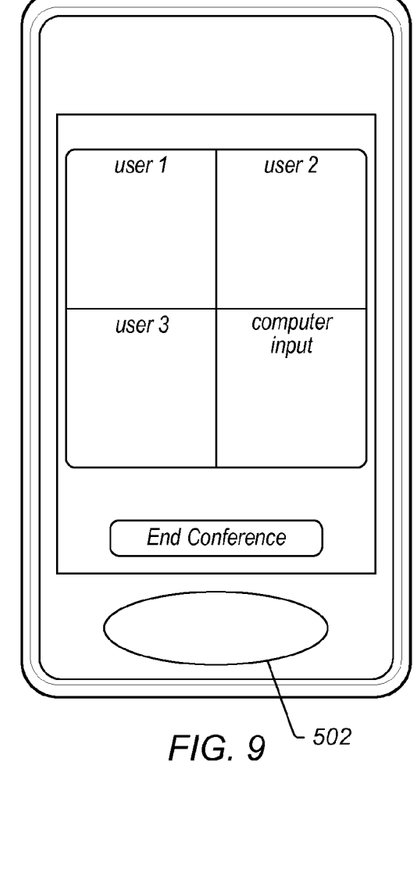

FIG. 9 illustrates an exemplary user interface for manipulating the video output in the videoconference (e.g., which may be the result of selecting the "screen" icon shown in FIG. 8). In one embodiment, the user interface shown in FIG. 9 may be also displayed in the videoconference display, such as display 101 in FIG. 1. Thus, the user interface and the videoconference display may always show the same thing. In alternate embodiments, the user interface may be provided only to the user of the mobile communication device 200 and may not be used to modify the appearance of the videoconference display. In this particular user interface, the display shows user 1 (of the videoconference) in the top left, user 2 in the top right, user 3 in the bottom left, and the computer input in the bottom right. The portions of the screen may display pictures representing each different video stream (e.g., a picture of user 1, user 2, etc.) or may provide a video stream similar to the one shown on the videoconference display. However, in some embodiments, the video stream on the user interface may be of lower quality than the one shown on the videoconference display (which may be in high definition). For example, the video stream(s) on the mobile conference device may be 30 fps, 15 fps, 10 fps, 5 fps, 2 fps, or possibly less than 1 fps, according to various embodiments. However, the video streams may be in high definition on the user interface, depending on the capabilities of the mobile communication device 200 and/or communication bandwidth.

Figure 10:
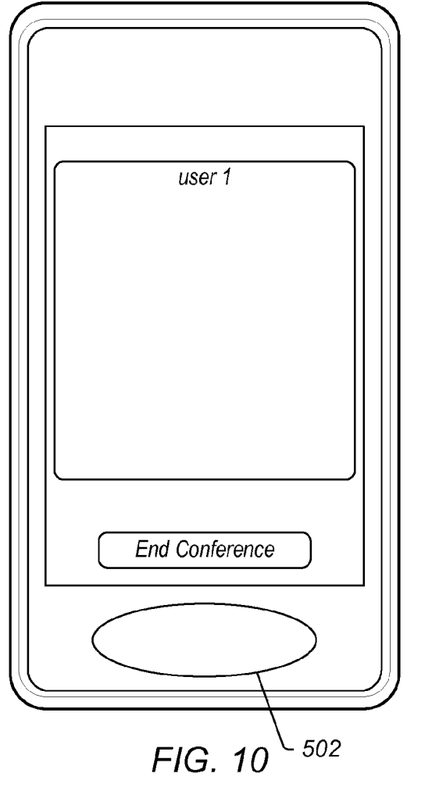

The user may be able to select a particular user, e.g., user 1, and maximize the video on the user interface (e.g., thereby resulting in the videoconference display similarly showing only user 1. This is shown in FIG. 10, where only user 1 is shown on the user interface. The user may be able to invoke this via various methods using the mobile communication device 200. For example, the user could "double tap" the screen of the mobile communication device 200 to maximize the desired video output. Thus, where the user interface and the videoconference display are interlinked, the videoconference may be displayed in a first visual configuration (e.g., where all of the participants are shown on the screen), and the user may provide a command to modify the first visual configuration (e.g., to only show one of the participants on the screen), and accordingly, the videoconference may be displayed in a second visual configuration (e.g., the result of the modification of the first visual configuration).

Figure 11:
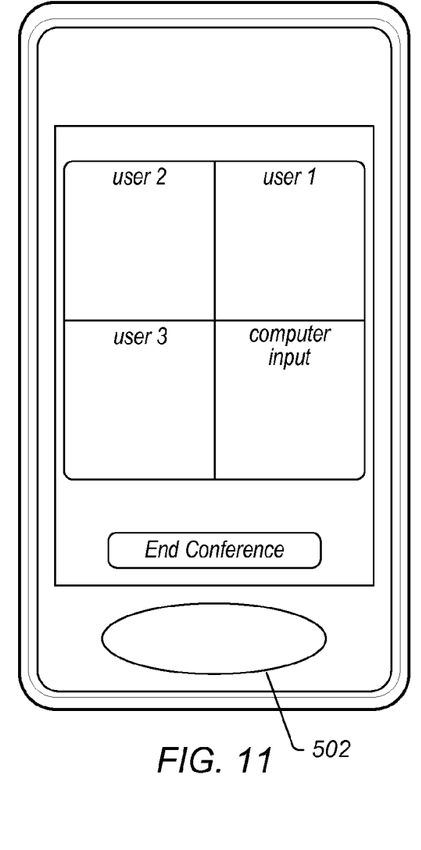
Figure 12:
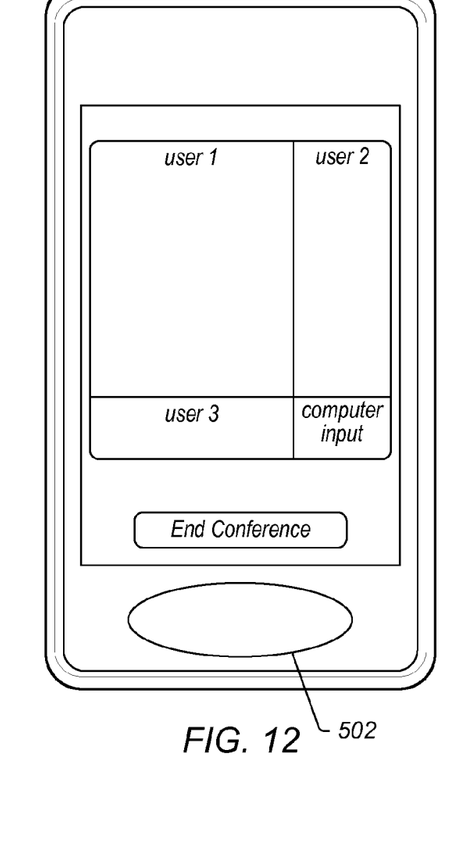

Additionally, the user may be able to change the order of the visual configuration. For example, the user may select the user 1 portion of the screen and drag it over to the user 2 portion of the screen, thereby switching the user 1 and user 2 positions on the screen, as shown in FIG. 11. In one embodiment, the user may do this by touching the user 1 portion, dragging it to the user 2 portion, and releasing (or ceasing to touch) the mobile communication device 200 (although other methods of selected and moving are envisioned which do not involve touch screens).

In one embodiment, the user may provide expansion or minimization gestures to the user interface to modify the appearance of the videoconferencing display. For example, the user could provide a "pinch" gesture (where two fingers are used on the screen and come closer to each other) on the touch screen of the mobile communication device 200 to minimize a portion of the screen. Alternatively, the user may provide a "reverse pinch" gesture (where two fingers are used on the screen and expand away from each other) to maximize a portion of the screen. For example, the user could provide a "reverse pinch" gesture on the user 1 portion of the screen, resulting in the display shown in FIG. 12. Note that the degree of maximization or minimization may depend on how far or how close fingers are with respect to each other at the end of the gesture. Thus, the degree of zoom may be dynamic.

Figure 13:
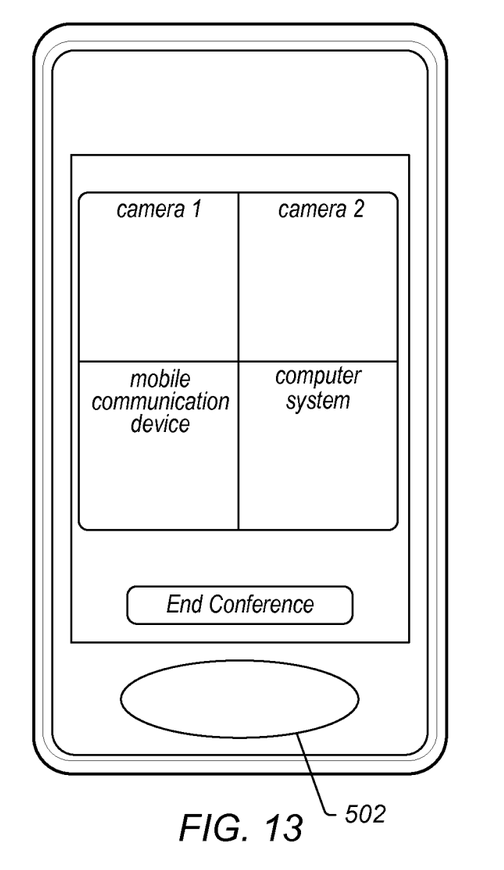

Finally, FIG. 13 provides an exemplary user interface for selecting the video input to be provided to the other users in the videoconference (e.g., which may be invoked by the "switch inputs" icon shown in FIG. 8). In this case, the user may select from a first camera of the videoconferencing system, a second camera of the videoconferencing system, a computer system (e.g., for showing the user interacting with an application on the computer system, such as a document editing program), or the mobile communication device 200 (e.g., for showing the user interacting with an application on the mobile communication device 200, or simply to show video output from the mobile communication device 200), among other selectable inputs.

As another example, the videoconferencing system may provide a first video stream in the videoconference (e.g., to the other members of the videoconference). The user may provide or select a command to modify or change from the first video stream (e.g., to switch from sending the user's video feed to a video feed of a desktop computer screen, or other video stream). Accordingly, the first video stream may be modified or switched to another video stream based on the command.

Additional Embodiments

The following provides additional features that may be incorporated into the above descriptions. In some embodiments, a telephone call on the mobile communication device 200 could be escalated to a videoconference, e.g., in a manual or an automatic fashion. For example, the user could be talking using normal telephonic communication using the mobile communication device 200 and walk into a room having (or otherwise get close to) a videoconferencing system. The user may then invoke this escalation or handoff manually, e.g., by selecting an interface element in the mobile communication device 200. Alternatively, the phone call could be automatically escalated to a videoconference (e.g., when at least a portion of the other member(s) of the phone call are capable of videoconferencing).

In one embodiment, the handoff may be performed via the mobile communication device 200 and the conferencing system communicating in a wireless fashion and/or when the mobile communication device 200 is docked or otherwise connected to the conference system. For example, the mobile communication device 200 may provide the contact information of the current telephone call and provide a command to the videoconferencing system to initiate a videoconference using this contact information. Once the videoconference is established, the mobile communication device 200 may terminate the telephone call and effectively "handoff" to the videoconference.

In another embodiment, during a conference, contact information may be retrieved from the conferencing system to the mobile communication device 200. Additionally, contact information may be retrieved from other users participating in the conference (e.g., using their own mobile communication devices 200) to the mobile communication device 200. Thus, contact information may be easily shared among the conferencing systems and/or mobile communication devices. For example, a user may select an option on the GUI of the mobile communication device 200 to obtain contact information from selected participants. In response to the user selection, the contact information may be provided from the remote participant and provided for storage in the contacts of the mobile communication device 200.

Additionally, the mobile communication device 200 may be configured to display or provide information about the conferencing system. For example, the user may be able to view (and/or modify) the configuration data of the conferencing system. For example, the user may be able to configure various audio and video settings of the conferencing system, network settings, etc. Thus, the display of the mobile communication device 200 may present a GUI that shows configuration data of the conferencing system, and possibly including options for modifying the configuration data of the conferencing system. The user may provide input to the GUI of the mobile communication device 200, and the device 200 may provide this input to the conferencing system, in a wired or wireless manner, to modify the audio and/or video settings of the conferencing system. The provided modifications may also cause the GUI of the device 200 to be updated accordingly, to reflect the current status of the conferencing system.

Additionally, the mobile communication device 200 may be able to display directory information, call history, call status, contact information, and/or any other information of the conferencing system. For example, the conferencing system may provide directory information, call history, call status, contact information, and/or other information to the mobile communication device 200 for display.

In some embodiments, the mobile communication device 200 may be able to display or store snapshots or video or audio clips (e.g., using the record functionality described above) of the conference, e.g., for later playback on the mobile communication device. In this embodiment, the mobile communication device 200 may receive the audio or video/audio data from the conferencing system and may store snapshots or video or audio clips from the conference. These may be later presented by the device in response to user input, e.g., displayed on the display of the device 200 and/or presented on the speakers of the device 200.

In one embodiment, the mobile communication device 200 may be able to display statistics associated with one or more conferences. The device 200 may receive statistics from the conferencing system for storage and/or display, or the device 200 may execute software which calculates statistics based on information received from the conferencing system.

The information described above may be provided within an application for interacting with the conferencing system of the mobile communication device. However, the information may be provided in alternate ways as well, e.g., using text messaging, emails, a web page, etc. Thus, the mobile communication device may provide information about the conferencing system, e.g., in addition to the functionality described with reference to the above Figures.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer accessible memory medium comprising program instructions for initiating a videoconference in a videoconferencing system, wherein the program instructions are executable to:
receive input to the videoconferencing system from a mobile communication device, wherein the input specifies one or more participants in the videoconference, wherein the one or more participants are selected from contact information stored on the mobile communication device, wherein the contact information is not otherwise associated with a program or application on the mobile communication device that is associated with the videoconferencing system;
initiate the videoconference in the videoconferencing system based on the received input, wherein the videoconference includes the one or more participants selected from the contact information stored on the mobile communication device.

2. The memory medium of claim 1, wherein said receiving input is performed in a wireless manner.

3. The memory medium of claim 1, wherein the program instructions are further executable to:
receive one or more commands from the mobile communication device during the videoconference, wherein the one or more commands correspond to one or more functions of the videoconferencing system; and
perform the one or more functions based on the one or more commands.

4. The memory medium of claim 3, wherein the program instructions are further executable to:
display the videoconference on a display in a first visual configuration;
wherein the one or more commands comprise a modification to the first visual configuration, and wherein said performing the one or more functions comprises displaying the videoconference on the display in a second visual configuration based on the one or more commands.

5. The memory medium of claim 1, wherein the contact information comprises one or more telephone numbers.

6. A method for initiating a videoconference in a videoconferencing system, the method comprising:
receiving input to the videoconferencing system from a mobile communication device, wherein the input specifies one or more participants in the videoconference, wherein the one or more participants are selected from contact information stored on the mobile communication device, wherein the contact information is not otherwise associated with a program or application on the mobile communication device that is associated with the videoconferencing system;
the videoconferencing system initiating the videoconference based on the received input, wherein the videoconference includes the one or more participants selected from the contact information stored on the mobile communication device.

7. The method of claim 6, wherein said receiving input is performed in a wired manner.

8. The method of claim 6, further comprising:
receiving one or more commands from the mobile communication device during the videoconference, wherein the one or more commands correspond to one or more functions of the videoconferencing system; and
performing the one or more functions based on the one or more commands.

9. The method of claim 8, further comprising:
providing a first video stream in the videoconference;
wherein the one or more commands comprise a modification to the first video stream, and wherein said performing the one or more functions comprises changing the first video stream to a second video stream based on the one or more commands.

10. The method of claim 6, wherein the contact information comprises one or more IP addresses.

11. A computer accessible memory medium storing program instructions for initiating a videoconference in a videoconferencing system from a mobile communication device, wherein the program instructions are executable to:
display a user interface on the mobile communication device, wherein the user interface displays contact information for one or more potential participants in the videoconference, wherein the contact information is not otherwise associated with a program or application on the mobile communication device that is associated with the videoconferencing system;
receive user input to the user interface of the mobile communication device, wherein the user input specifies one or more participants for the videoconference;
provide information regarding the one or more participants for the videoconference from the mobile communication device to the videoconferencing system;
wherein the videoconferencing system is operable to initiate the videoconference with the one or more participants based on the information received from the mobile communication device.

12. The memory medium of claim 11, wherein said providing information is performed in a wireless manner.

13. The memory medium of claim 11, wherein the program instructions are further executable to:
receive further user input to the user interface during the videoconference, wherein the further user input specifies one or more commands corresponding to one or more functions of the videoconference; and
provide the one or more commands to the videoconferencing system.

14. The memory medium of claim 13,
wherein the one or more commands comprise a command to modify to a first visual configuration of a display of the videoconference.

15. The memory medium of claim 11, wherein the contact information comprises one or more telephone numbers.

16. A method for initiating a videoconference in a videoconferencing system from a mobile communication device, comprising:
displaying a user interface on the mobile communication device, wherein the user interface displays contact information for one or more potential participants in the videoconference, wherein the contact information is not otherwise associated with a program or application on the mobile communication device that is associated with the videoconferencing system;
receiving user input to the user interface of the mobile communication device, wherein the user input specifies one or more participants for the videoconference;
providing information regarding the one or more participants for the videoconference from the mobile communication device to the videoconferencing system;

wherein the videoconferencing system is operable to initiate the videoconference with the one or more participants based on the information received from the mobile communication device.

17. The method of claim 16, wherein said providing information is performed in a wired manner.

18. The method of claim 16, further comprising:
receiving further user input to the user interface during the videoconference, wherein the further user input specifies one or more commands corresponding to one or more functions of the videoconference; and
providing the one or more commands to the videoconferencing system.

19. The method of claim 18, wherein the one or more commands comprise a command to switch from a first video stream provided in the videoconference to a second video stream provided in the videoconference.

20. The method of claim 16, wherein the contact information comprises one or more IP addresses.

21. A method for initiating an audio conference using a speakerphone, the method comprising:
receiving input to the speakerphone from a mobile communication device, wherein the input specifies one or more participants in the audioconference, wherein the one or more participants are selected from contact information stored on the mobile communication device, wherein the contact information is not otherwise associated with a program or application on the mobile communication device that is associated with the speakerphone;
the speakerphone initiating the audioconference based on the received input, wherein the audioconference includes the one or more participants selected from the contact information stored on the mobile communication device.

22. The method of claim 21, wherein said receiving input is performed in a wireless manner.

23. The method of claim 21, further comprising:
receiving one or more commands from the mobile communication device during the audioconference, wherein the one or more commands correspond to one or more functions of the speakerphone; and
performing the one or more functions based on the one or more commands.

24. The method of claim 21, wherein the contact information comprises one or more telephone numbers.

25. The method of claim 21, further comprising:
connecting to the mobile communication device in a wired manner.

26. A memory medium storing program instructions for initiating an audioconference using a speakerphone from a mobile communication device, wherein the program instructions are executable to:
display a user interface on the mobile communication device, wherein the user interface displays contact information for one or more potential participants in the audioconference, wherein the contact information is not otherwise associated with a program or application on the mobile communication device that is associated with the speakerphone;
receive user input to the user interface of the mobile communication device, wherein the user input specifies one or more participants for the audioconference;
provide information regarding the one or more participants for the audioconference from the mobile communication device to the speakerphone;
wherein the speakerphone is operable to initiate the audioconference with the one or more participants based on the information received from the mobile communication device.

27. The memory medium of claim 26, wherein said providing information is performed in a wireless manner.

28. The memory medium of claim 26, wherein the program instructions are further executable to:
receive further user input to the user interface during the audioconference, wherein the further user input specifies one or more commands corresponding to one or more functions of the speakerphone; and
provide the one or more commands to the speakerphone.

29. The memory medium of claim 26, wherein the contact information comprises one or more telephone numbers.

30. The memory medium of claim 26, wherein the program instructions are further executable to:
connect to the speakerphone device in a wired manner.

* * * * *